United States Patent
Preston

(10) Patent No.: US 8,823,264 B2
(45) Date of Patent: Sep. 2, 2014

(54) LIGHT SOURCE

(75) Inventor: Barry Preston, Melton Mowbray (GB)

(73) Assignee: Ceravision Limited

(*) Notice: Subject to any disclaimer, the term of this patent is extended or adjusted under 35 U.S.C. 154(b) by 300 days.

(21) Appl. No.: 13/501,048
(22) PCT Filed: Oct. 18, 2010
(86) PCT No.: PCT/GB2010/001922
§ 371 (c)(1),
(2), (4) Date: Jul. 19, 2012
(87) PCT Pub. No.: WO2011/048359
PCT Pub. Date: Apr. 28, 2011

(65) Prior Publication Data
US 2012/0274210 A1    Nov. 1, 2012

(30) Foreign Application Priority Data
Oct. 21, 2009   (GB) .................................. 0918515.8

(51) Int. Cl.
*H01J 65/04*    (2006.01)
*H01J 1/50*    (2006.01)
*H01J 61/30*    (2006.01)
(52) U.S. Cl.
CPC ............... *H01J 65/044* (2013.01); *H01J 61/30* (2013.01); *Y02B 20/22* (2013.01)
USPC .......... 315/34; 313/161; 313/634; 313/231.61

(58) Field of Classification Search
USPC ........ 315/34, 248; 313/160, 161, 231.61, 634
See application file for complete search history.

(56) References Cited

U.S. PATENT DOCUMENTS 8,089,203 B2 *   1/2012  Neate ............................ 313/160

* cited by examiner

*Primary Examiner* — Daniel D Chang
(74) *Attorney, Agent, or Firm* — Jennifer Meredith, Esq.; Meredith & Keyhani, PLLC

(57) ABSTRACT

A lamp has microwave resonant body (11) of transparent quartz. The body has a central bore (16), having a sealed plasma enclosing bulb (17) inserted in it. The bulb is of quartz also and has an external diameter which is a close fit in the bore. The bulb itself is of drawn quartz tube (18) and as such has a smooth internal bore (19). End caps (20) are fused to the tube and encapsulate a charge of a material excitable to form a light emitting plasma in the bulb when microwaves are fed into the body via an antenna (7) in a bore (21) in the body. The body is sized to establish resonance within the Faraday cage in the body (11), bulb (17) and fill containing void (22) within the bulb. There is negligible gap between the bulb and body, whereby they can be regarded as one for resonance purposes. The bulb is fixed in the body by welds (23).

15 Claims, 3 Drawing Sheets

LIGHT SOURCE

The present invention relates to a light source for a microwave-powered lamp.

It is known to excite a discharge in a capsule with a view to producing light. Typical examples are sodium discharge lamps and fluorescent tube lamps. The latter use mercury vapour, which produces ultraviolet radiation. In turn, this excites fluorescent powder to produce light. Such lamps are more efficient in terms of lumens of light emitted per watt of electricity consumed than tungsten filament lamps. However, they still suffer the disadvantage of requiring electrodes within the capsule. Since these carry the current required for the discharge, they degrade and ultimately fail.

We have developed electrodeless bulb lamps, as shown in our patent application Nos. PCT/GB2006/002018 for a lamp (our "'2018 lamp"), PCT/GB2005/005080 for a bulb for the lamp and PCT/GB2007/001935 for a matching circuit for a microwave-powered lamp. These all relate to lamps operating electrodelessly by use of microwave energy to stimulate light emitting plasma in the bulbs. Earlier proposals involving use of an airwave for coupling the microwave energy into a bulb have been made for instance by Fusion Lighting Corporation as in their U.S. Pat. No. 5,334,913. If an air wave guide is used, the lamp is bulky, because the physical size of the wave guide is a fraction of the wave length of the microwaves in air. This is not a problem for street lighting for instance but renders this type of light unsuitable for many applications. For this reason, our '2018 lamp uses a dielectric wave-guide, which substantially reduces the wave length at the operating frequency of 2.4Ghz. This lamp is suitable for use in domestic appliances such as rear projection television.

In our International Application No. PCT/GB2008/003829, now published under No. WO 2009/063205, we provide a light source to be powered by microwave energy, the source having:
- a solid plasma crucible of material which is transparent or translucent for exit therefrom, the plasma crucible having a sealed void in the plasma crucible,
- a Faraday cage surrounding the plasma crucible, the cage being at least partially light transmitting for light exit from the plasma crucible, whilst being microwave enclosing,
- a fill in the void of material excitable by microwave energy to form a light emitting plasma therein, and
- an antenna arranged within the plasma crucible for transmitting plasma-inducing microwave energy to the fill, the antenna having:
  - a connection extending outside the plasma crucible for coupling to a source of microwave energy;

the arrangement being such that light from a plasma in the void can pass through the plasma crucible and radiate from it via the cage.

As used in that application and this specification:
"lucent" means that the material, of which the item described as lucent, is transparent or translucent;
"plasma crucible" means a closed body enclosing a plasma, the latter being in the void when the latter's fill is excited by microwave energy from the antenna.

The object of the present invention is to provide an improved a light source to be powered by microwave energy.

According to the invention there is provided a light source to be powered by microwave energy, the source having:
- a dielectric body of material which is lucent for exit of light therefrom,
- a void within the dielectric body,
- a microwave-enclosing Faraday cage surrounding the dielectric body,
  - the dielectric body within the Faraday cage providing a microwave resonant cavity,
- a sealed plasma enclosure of lucent material within the void within the dielectric body,
- means for locating the plasma enclosure within the void with respect to the dielectric body,
- a fill, sealed in the plasma enclosure, of material excitable by microwave energy to form a light emitting plasma, and
- an antenna extending within the Faraday cage for transmitting plasma-inducing, microwave energy to the fill, the antenna having:
  - a connection extending outside the body for coupling to a source of microwave energy.

Normally, both the body and the enclosure will of the same material, preferably quartz.

Preferably the sealed plasma enclosure is formed of drawn quartz tube, drawing of the tube providing a smooth internal bore. The tube can be accommodated in a bore in the dielectric body with a gap. This arrangement provides a smooth bore of the enclosure and isolates any stress raising cracks in the bore in the dielectric body from the intense heat of the plasma. Preferably the gap is such as to be negligible in terms of microwave resonance in the body, within the Faraday cage.

It can be envisaged that the tubular enclosure could sealed with fused on quartz caps and the entire structure inserted in the bore in the body. It can be located by fusing of the caps to the body, particularly where this is of quartz. However, such a construction does not lend itself to easy fabrication.

Normally, the enclosure will be formed by necking down tube of the enclosure. After filling and sealing, the necked down portions can be supported by discs fused across ends of the void.

In another embodiment, at least one tubular portion outwards of the necked down portion of the enclosure tube is un-necked and is fused to the body. The or each tubular portion outwards of the necked down portion can be upset to fit the void for fusing to it. Alternatively, wherein one or two tubular portions outwards of the necked down portions of the enclosure tube are fused into one or two respective tubular pieces attached to face or faces of the body at its void having the enclosure.

The enclosure can held at one end only by a tubular piece, with the other end of the void being open. Alternatively, the enclosure can again be held at one end only by a tubular piece, with the other end of the void being closed.

Advantageously, the bore in the body will be larger than the outside diameter of the plasma enclosure, allowing a thermal barrier between the enclosure and the body.

In one embodiment, the enclosure is sealed with little necking, leaving a piece of its original tubing attached. This provides accommodation for the antenna to extend into the body without need for a separate antenna bore in the body. In this embodiment, the tube extends out of the body and is attached to a further tube extending back to the body, thereby providing a long thermal path between enclosure and the body.

Any gap between the enclosure and the body is preferably sealed independently of the enclosure. The gap can be evacuated for further thermal isolation or can be filled with a gas, typically an inert gas such as nitrogen. Whilst some convection of the nitrogen can be expected, this arrangement still provides appreciable insulation of the plasma enclosure from the dielectric body.

To help understanding of the invention, a specific embodiment thereof will now be described by way of example and with reference to the accompanying drawings, in which.

Figure 1:
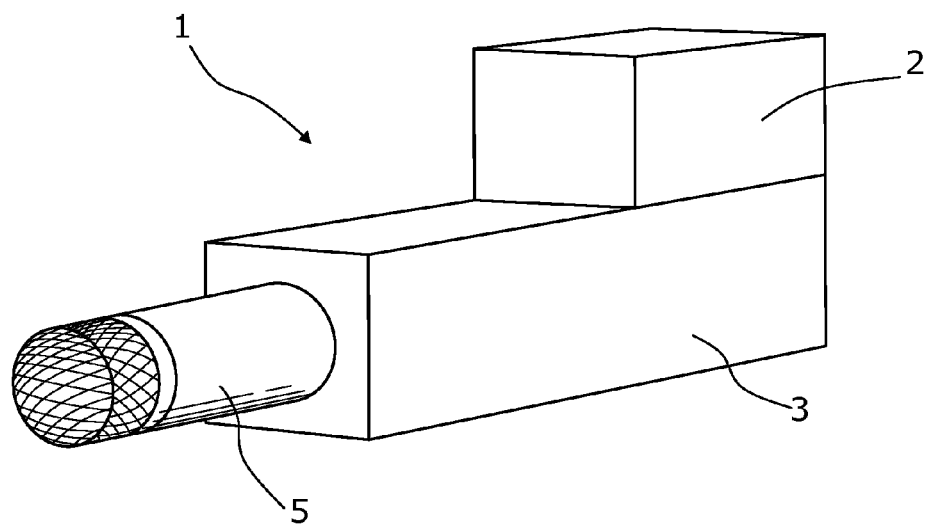
FIG. 1 is a diagrammatic perspective view of a light source according to the invention.
Figure 2:
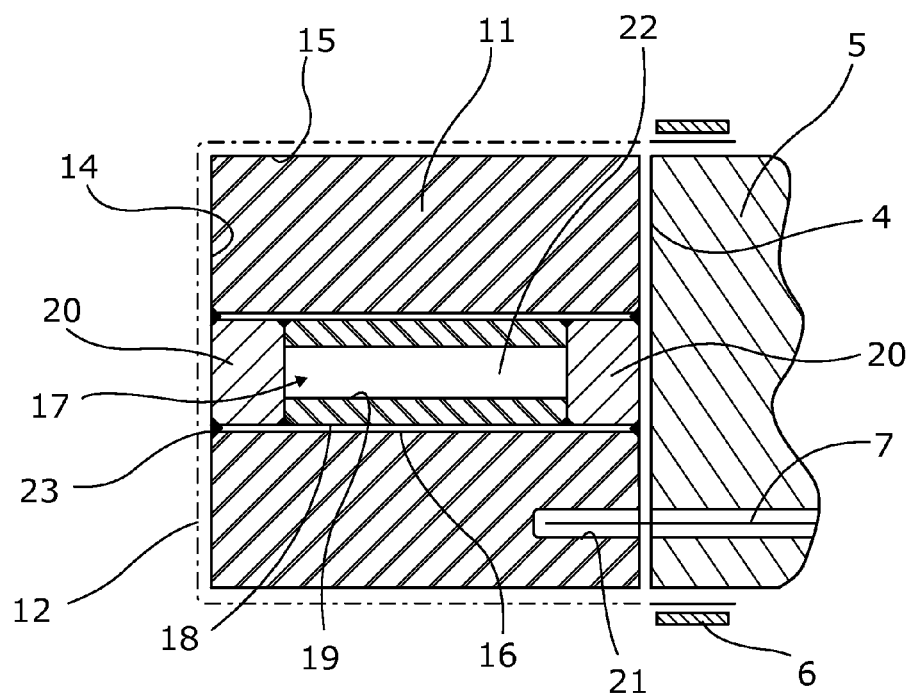
FIG. 2 is a cross-sectional side view of a microwave resonant body including a bulb included in the light source of FIG. 1.

Referring to the drawings, a lamp 1 of the invention is powered by a magnetron 2 via a coupling circuit 3. Details of the latter are given in our co-pending patent application No 090,7947.6, dated 8 May 2009. Since they form no part of the present invention as such, they will not be described in further detail.

The lamp has microwave resonant body 11 of transparent quartz. It is supported on an end face 4 of an aluminium end piece 5 of the coupling circuit 3. The body and the end piece are circular and of the same diameter, whereby a perforate Faraday cage 12 crossing an end face 14 of the body and its circular side 15 and clamped by a tensioned band 6 to the coupling end piece secures the body to end piece. This detail is essentially similar to that described in our patent application No 090,7947.6, just referred to.

The body has a central bore 16, having a sealed plasma enclosing bulb 17 inserted in it. The bulb is of quartz also and has an external diameter which is a close fit in the bore. The bulb itself is of drawn quartz tube 18 and as such has a smooth internal bore 19. End caps 20 are fused to the tube and encapsulate a charge of a material excitable to form a light emitting plasma in the bulb when microwaves are fed into the body via an antenna 7 in a bore 21 in the body. The body is sized to establish resonance within the Faraday cage in the body 11, bulb 17 and fill containing void 22 within the bulb. There is negligible gap between the bulb and body, whereby they can be regarded as one for resonance purposes. The bulb is fixed in the body by seals 23.

This arrangement isolates the possibility of fracture inducing micro-cracks which may remain after drilling of the bore 16, experiencing the very high temperature in a plasma induced in excitable material in the void during use. Rather the plasma and the gas supporting it is contained within the smooth, micro-crack free bore of the bulb.

Figure 3:
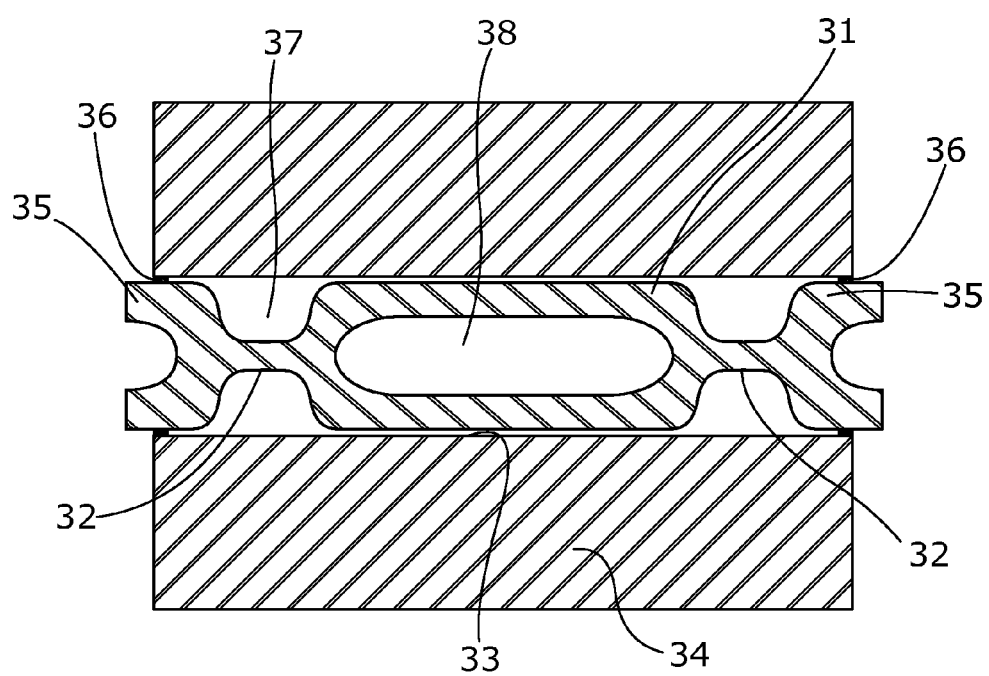
FIG. 3 is a similar view of a second resonant body.

Turning to FIG. 3, an alternative bulb construction is shown, in which the bulb 31 is formed of drawn quartz tube, with necked-down seals 32. Again the tube is a close fit in the bore 33 in the body 34. At the ends of the bore, the necks are upset 35 and sealed 36 into the bore. The result is a structure with small spaces 37 inside the seals 36, but effectively for the purposes of resonance, it is a solid body having only a plasma void 38 in the bulb 31.

Figure 4:
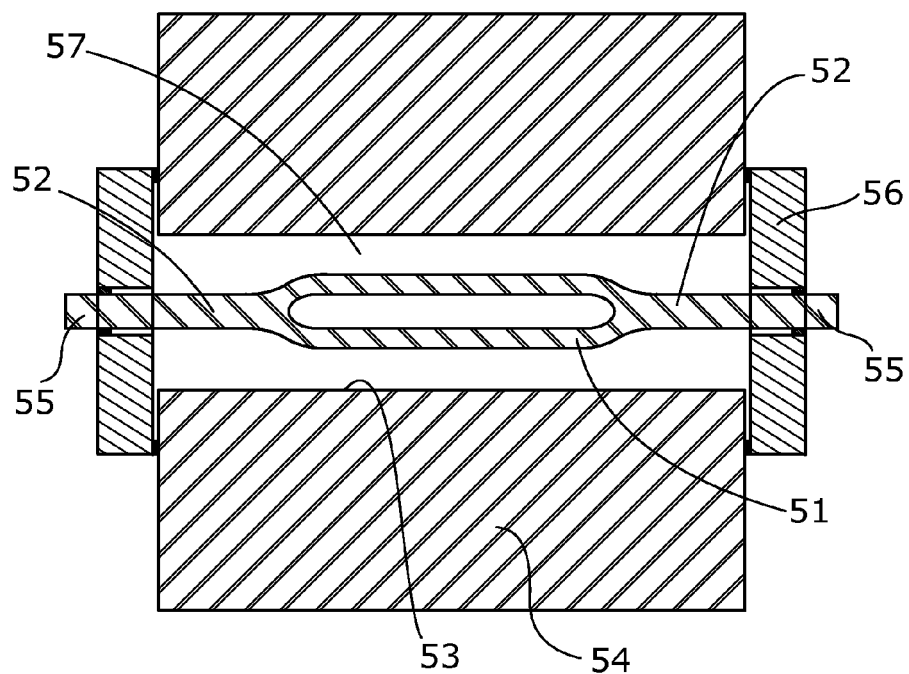
FIG. 4 is a similar view of a third resonant body.

In FIG. 4, there is shown a variant in which the bulb 51 of drawn quartz tube, with neck-down seals 52, is smaller in diameter than the bore 53 in the body 54. The bulb is supported in the body via its necks 55 being supported in apertured discs 56. These are sealed to both the necks and the body. The result is that the bulb is thermally insulated from the dielectric body and is able to run hotter with less heat being conducted to the body via the necks. Since quartz has a low coefficient of thermal expansion, it is expected that this structure will resist thermally induced stresses due to differential expansion of the bulb and the body. Nevertheless, the bulb can be located in the bore 53 at one end only to one apertured disc 56, with the disc at the other end not being apertured. The sealed space 57 surrounding the bulb can be evacuated prior to sealing or filed with inert gas such as nitrogen. Whether the space is evacuated or filled with gas, it will have a small and theoretical determinable effect on the microwave frequency at which resonance is established in the body.

Figure 5:
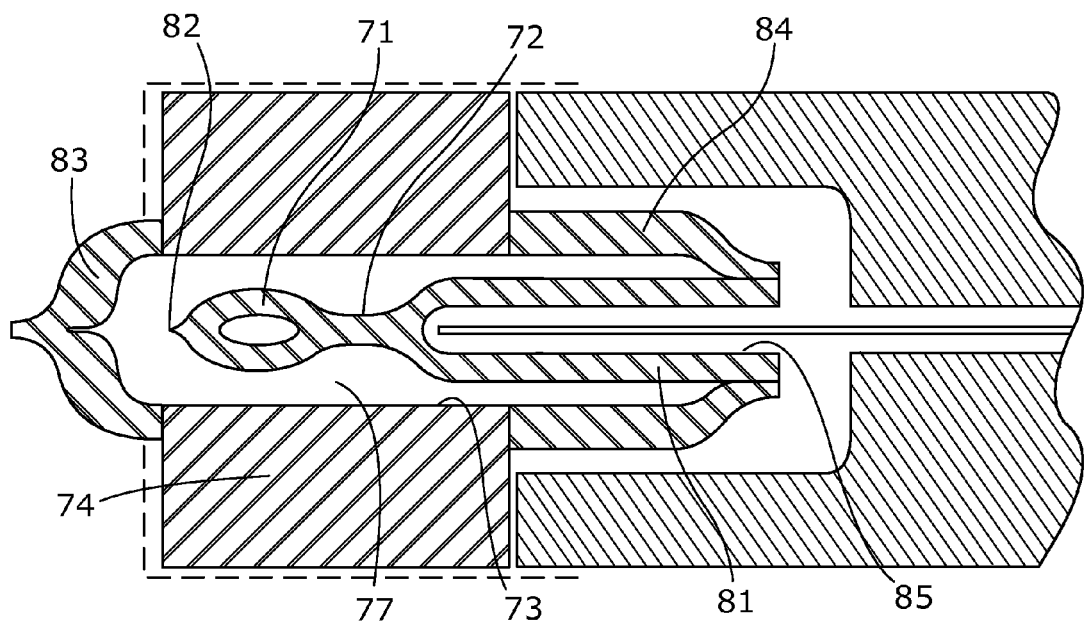
FIG. 5 is a similar view of a fourth resonant body.

The further embodiment shown in FIG. 5 has a bulb 71 also of drawn quartz tube, having a necked down seal 72 at one end, beyond which the tube 81 continues away from the seal 72 at the full diameter of the diameter of the tube. As with the above embodiments, the tube is drawn and has a smooth, crack resistant interior. The end 82 of the bulb remote from the seal 72 is sealed and the bulb includes a charge or fill of excitable material able to support a plasma. The bulb is supported in a bore 73 in a transparent, resonant quartz body 74. The bore is sealed at its end equivalent to the bulb end 82, by means of a larger diameter piece of quartz tube 83 fused onto the body, then necked down and sealed off.

Another piece of large diameter tube 84 is fused onto the opposite end of the body and surrounds the bulb tube 81 remote from the bulb. The distal ends of these two tubes are fused together, by necking the outer tube onto the inner tube, fusing them together and removing the excess of each. Conveniently this operation is performed prior to the necking down and sealing of the opposite end tube 83, whose necking and sealing excludes the ambient atmosphere from the sealed space 77 between the bulb and the bore of the resonant body.

The structure:

locates the bulb centrally in the bore 73;

provides an insulation gap between the bulb and the body;

provides a long conduction path between along the tubes 81, 84 from the bulb to the bore;

provides a location 85 centrally of the bulb tube 81 for an antenna 77 for introducing microwaves into the body.

Figure 6:
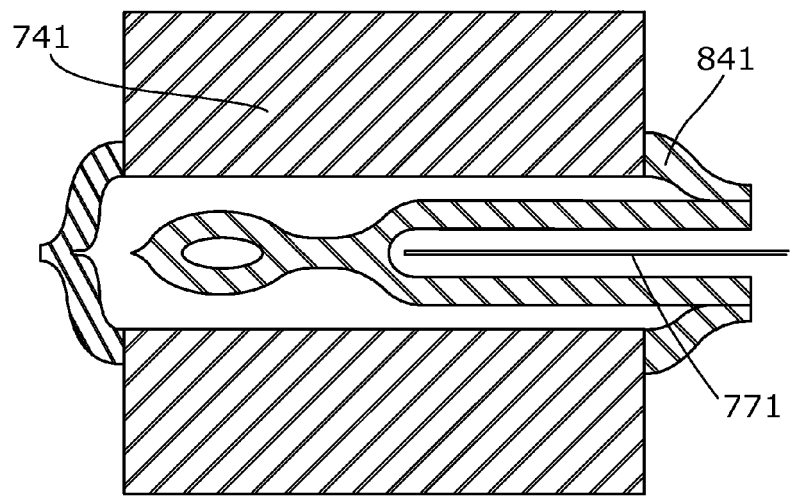
FIG. 6 is a similar view of a variant of the fourth resonant body.

In a variant shown in FIG. 6, where the mode of resonance within the body depends only on the diameter of the body and not on its axial length, the body is longer in proportion and outer tube 841 is vestigial. This arrangement allows greater proportional extension of the antenna 771 into the body 741.

It is envisaged that the embodiments of FIGS. 4, 5 & 6 in particular will allow lower wattage operation in that the bulbs 51,71 will run hotter due to better thermal insulation. Thus the fills will be able to be kept hot enough for light emitting discharge at lower powers.

The invention claimed is:

1. A light source to be powered by microwave energy, the source having:

a dielectric body of material which is lucent for exit of light therefrom, a void within the dielectric body, a microwave-enclosing Faraday cage surrounding the dielectric body, the dielectric body within the Faraday cage providing a microwave resonant cavity, a sealed plasma enclosure of lucent material within the void within the dielectric body, means for locating the plasma enclosure within the void with respect to the dielectric body, a fill, sealed in the plasma enclosure, of material excitable by microwave energy to form a light emitting plasma, and an antenna extending within the Faraday cage for transmitting plasma-inducing, microwave energy to the fill, the antenna having:

a connection extending outside the body for coupling to a source of microwave energy.

2. A light source as claimed in claim 1, wherein the body and the enclosure are of quartz.

3. A light source as claimed in claim 1, wherein the void is a bore in the body and the sealed plasma enclosure is accommodated in the bore with a gap between the enclosure and the bore.

4. A light source as claimed in claim 1, wherein the sealed plasma enclosure is formed of drawn tube.

5. A light source as claimed in claim 4, wherein:
the tubular enclosure has fused on quartz caps, sealing its ends,
the enclosure and discs structure is located by fusing of the caps to the body with the enclosure in the void.

6. A light source as claimed in claim 4, wherein the sealed plasma enclosure has necked, sealing portions of its tube.

7. A light source as claimed in claim 6, wherein the necked sealing portions are supported by discs fused across ends of the void.

8. A light source as claimed in claim 6, wherein at least one tubular portion outwards of the necked down portion of the enclosure tube is un-necked and is fused to the body.

9. A light source as claimed in claim 8, wherein at least one tubular portion outwards of the necked down portion is upset to fit the void.

10. A light source as claimed in claim 6, wherein one or two tubular portions outwards of the necked down portions of the enclosure tube are fused into one or two respective tubular pieces attached to face or faces of the body at its void having the enclosure.

11. A light source as claimed in claim 10, wherein the enclosure is held at one end only by a tubular piece and the other end of the void is open.

12. A light source as claimed in claim 10, wherein the enclosure is held at one end only by a tubular piece and the other end of the void is closed.

13. A light source as claimed in claim 8, wherein at least one of the tubular portions is open and is arranged to provides accommodation for the antenna to extend into the body.

14. A light source as claimed in claim 1, wherein a gap between the enclosure and the body is sealed and evacuated independently of the enclosure.

15. A light source as claimed in claim 12, wherein the evacuated gap is filled with inert gas.

* * * * *